United States Patent [19]
Collier et al.

[11] Patent Number: 5,829,151
[45] Date of Patent: Nov. 3, 1998

[54] MULTI-AXIS PART POSITIONING SYSTEM

[75] Inventors: Scott Mitchell Collier, Tacoma; Paul Edward Jennerjohn, Redmond, both of Wash.

[73] Assignee: The Boeing Company, Seattle, Wash.

[21] Appl. No.: 772,666

[22] Filed: Dec. 20, 1996

[51] Int. Cl.⁶ .............................. B23Q 3/06; G01B 21/20
[52] U.S. Cl. .................... 33/573; 33/1 M; 33/549
[58] Field of Search .......................... 33/1 M, 502, 503, 33/505, 549, 556, 557, 558, 559, 560, 561, 568, 573; 269/296; 254/89 R

[56] References Cited

U.S. PATENT DOCUMENTS

| | | | |
|---|---|---|---|
| 4,684,113 | 8/1987 | Douglas et al. | 269/21 |
| 5,107,599 | 4/1992 | Marincic et al | 33/573 |
| 5,249,785 | 10/1993 | Nelson et al. | 269/21 |
| 5,364,083 | 11/1994 | Ross et al. | 269/21 |
| 5,457,868 | 10/1995 | Blaimschein | 29/559 |
| 5,546,784 | 8/1996 | Haas et al. | 72/413 |

OTHER PUBLICATIONS

Gary S. Vasilash, *Fast, Flexible Fixturing for Measurement Tasks*, Nov. 1995, Production, 3 pages.

*Primary Examiner*—G. Bradley Bennett
*Attorney, Agent, or Firm*—Lawrence W. Nelson

[57] ABSTRACT

A universal fixture holds a component relative to an established reference frame. The fixture includes a base fixable relative to the established reference frame, and a plurality of stanchions continuously movable along a plane defined by a surface of the base.

14 Claims, 9 Drawing Sheets

MULTI-AXIS PART POSITIONING SYSTEM

BACKGROUND OF THE INVENTION

1. Field of the Invention

The present invention relates to a fixture for positioning parts, and more particularly to a fixture capable of positioning parts of different shapes and sizes.

2. Background Information

Coordinate measuring machines (CMM's) are a well known means of checking the accuracy of manufactured parts, such as contoured workpieces which are prevalent in the aerospace industry. Some form of fixture is needed to hold a component to be checked in a known orientation, one which presents the component in a fixed reference frame in the X, Y, and Z-axis. Ideally, the fixture would hold the part with sufficient accuracy such that the part could be measured immediately. That is, if the fixture were sufficiently accurate, it would not be necessary to take initial readings on the part to establish the origin and datum planes of the part. However, that level of accuracy has not been accomplished with the current state-of-the-art.

Currently, the most common fixture is the knee block shown in FIG. 1. Here, a solid metal block 20 is lifted onto a stable platform 22, such as a granite slab. A drawback of the block 20 is that it is extremely heavy, and if lifted improperly onto the platform 22, it may cause an operator injury. A component 24 is measured by a CMM 26 using a touch probe 28. The component 24 is fastened to the block 20 with double backed adhesive tape (not shown). For extra stability, the block 20 may be clamped to the platform 22. Alternatively, the block 20 could be a series of dimensioned disks of various heights in combination with parallel bars, etc., all positioned in an attempt to properly place the component 24 below the probe 28 of the CMM 26.

Once the component 24 has been adequately fixed in place with the adhesive tape, the CMM 26 is manually taught the location of the component 24. This is accomplished by establishing datum planes for the component 24, which are related back to a machine axis of the CMM 26. The datum planes are currently determined by touching specific points on a plane or surface of component 24, as specified by a plan of the component 24.

The operator moves the probe 28 to the specified points on the component 24 under the control of a joy stick (not shown). Thus, the position of the points touched is determined "by eye." This leaves a tremendous amount of room for error and variation for each attempted measurement. By manually touching every designated point on the component 24, the datum plane will be setup slightly different for each attempt. Accordingly, a setup error occurs for each component and this setup error varies from component to component. This frustrates any attempts to monitor trends in machining accuracy such as the use of statistical process control procedures. Further, the procedure results in the acceptance of components that are really out of tolerance and the rejection of components that are actually within acceptable tolerance.

Once the specified points used to determine the datum planes have been manually located, the CMM 26 aligns the CMM 26 to the component by beginning an iterative process of checking the datum planes on the components to verify that they are where they are designed to be. First the Z=0 plane is checked by the CMM 26, then rotation, then one point is checked at the end of the component 24. These iterations are repeated over and over until the CMM 26 is aligned to the component within designated datum planes and have been tolerance calculated. The measurements are then taken by the CMM 26 and compared against drawing measurements. However, the interations are time consuming.

Another common fixture is the "dedicated" fixture. The dedicated fixture is a large, solid, heavy unit that is unique to the component to be measured and is positioned similar to the block 20. However, although accurate, the dedicated fixture is expensive to make and store and is still unreliable since its size will vary with temperature. Also, the dedicated fixture requires a long lead time before it can be used in production. Further, the dedicated fixture cannot provide means of flexible manufacturing but requires a unique design for each component. Finally, like the block, the dedicated fixture can cause injury to an operator if lifted into place improperly.

A universal fixture is designed to accommodate several different parts. The universal fixture typically consists of a heavy base with a peg-board grid of drilled holes in which various part holders can be removably mounted in a general position similar to the block 20. The part holders are placed at as many locations in the base as necessary to support any particular component. The base is fixed accurately relative to the CMM 26 and, if the part holders are fixed accurately relative to the base, then the part is fixed accurately relative to the CMM 26. However, because the universal fixture takes so long to setup, it tends to be used like a permanent dedicated fixture. Further, the universal fixture is not accurate or consistent since it will vary each time it is constructed. Thus, the universal fixture is subject to variation from component to component relative to the measured axis system. Yet another drawback is that the universal fixture tends to hold the component 24 in a manner that distorts it.

Yet another fixture in current use is a shaft driven fixture using screw drives attached to a machine bed on a dedicated table generally positioned similar to the block 20. Partholders (not shown) are vertically positioned and movable along an X and Y-axis and driven by a dual axis linear screws. However, the individual part holders cannot cross over the axis of each other to reach their respective position. The position along the Z-axis can be controlled by moving the part holder hydraulically or with a motor. Since the respective screw drives won't allow the part holders to cross over each other's axis, continuous movement of a part holder along the dedicated table is not possible and the part holders can rarely reach their optimal position for supporting the component 24.

Another current form of fixture positions part holders on the platform 22 by moving them with the CMM 26 to a desired position. The positioning of each of the part holders is determined by a part specific program, and once placed according to the program, each of the part holders is manually locked into place by the operator. The part holders are positioned using a special holder on the CMM 26 in place of the probe 28. However, components cannot be measured while the CMM 26 is being used to position the part holders. Also, the positioning of each holder takes human intervention, and a significant amount of time to properly position and lock down the part holder. Further, the special holder must be removed and replaced with a touch probe.

The current state of the art in fixtures falls short of the requirements of today's manufacturing needs. All the above fixtures require some operator involvement in setting up and placing the fixtures on the platform 22. It is impossible to achieve meaningful statistical results over several orders of the component 24 because operators are unable to achieve repeatable setups. Achieving repeatable and reproducible setups over several orders is necessary to achieve a process capability good enough to produce statistically valued results. For the foregoing reasons, there is a need for an accurate fixturing system that allows repeatable programmed setups that can be performed faster than current setup methods. The fixture should allow the use of the CMM 26 while it is being setup, and utilize a simple, repeatable fixturing process to improve the quality of the parts being manufactured.

SUMMARY OF THE INVENTION

According to the present invention, a universal fixture holds a component relative to an established reference frame. The fixture includes a base fixable relative to the established reference frame, and a plurality of stanchions continuously movable along a plane defined by a surface of the base.

BRIEF DESCRIPTION OF THE DRAWINGS

These and other features, aspects, and advantages of the present invention will become better understood with regard to the following description, appended claims, and accompanying drawings where:

DESCRIPTION OF A PREFERRED EMBODIMENT

Figure 1:
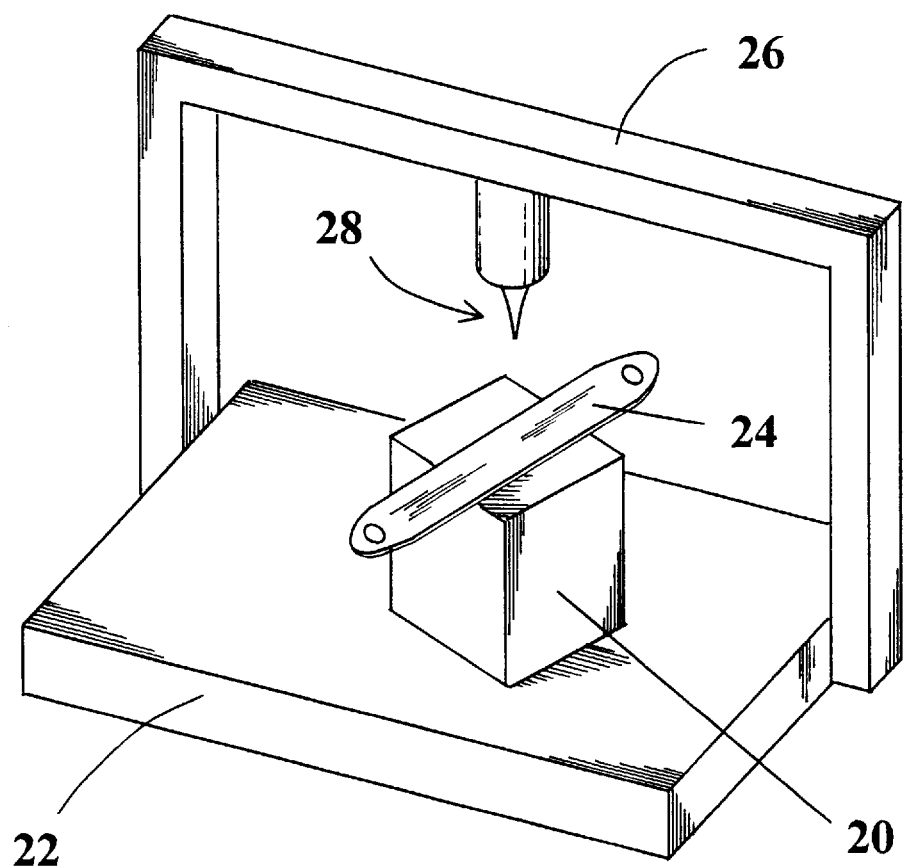
FIG. 1 is a perspective view of a prior art fixturing system.
Figure 2:
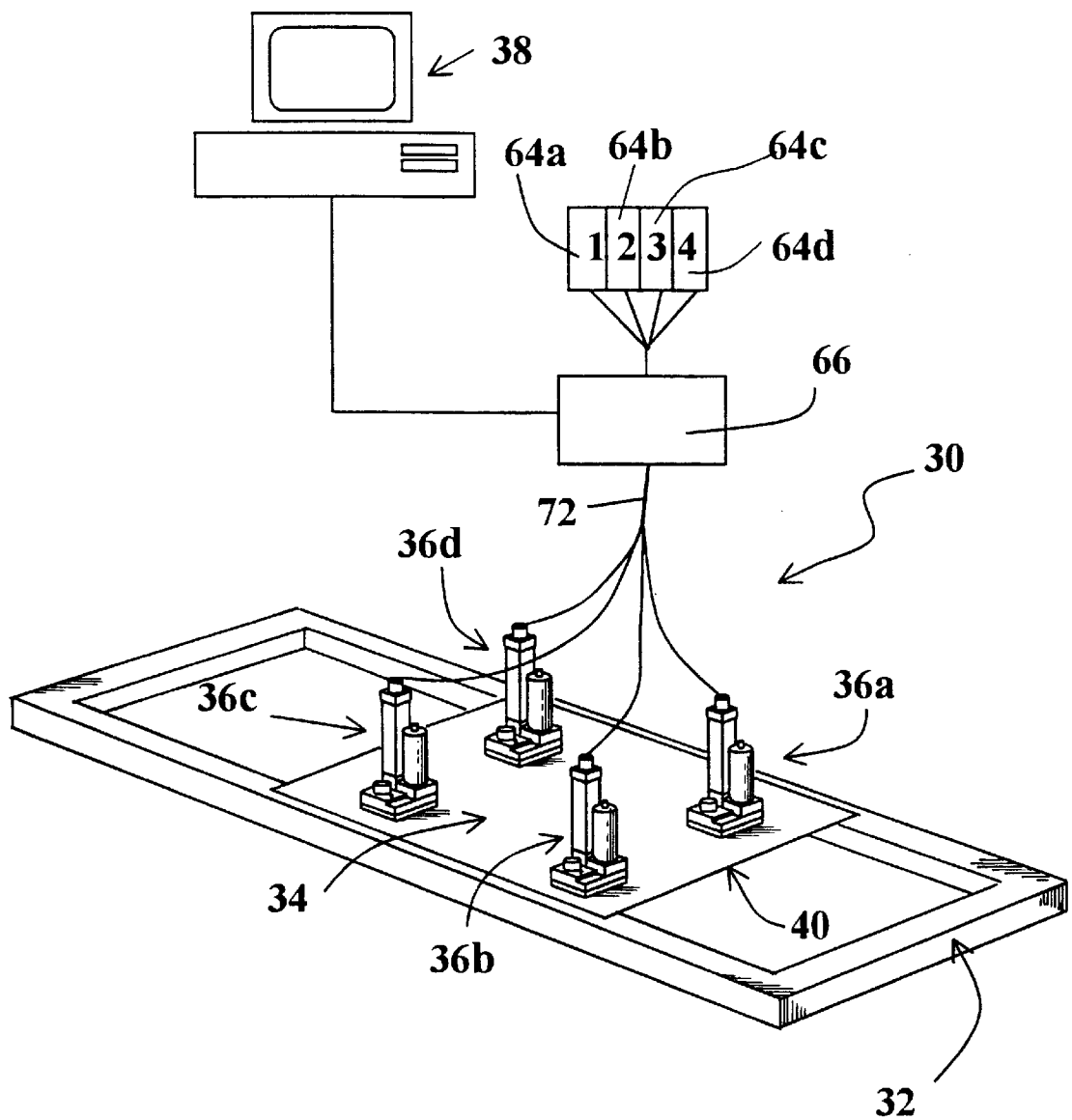
FIG. 2 is a perspective view of a multi-axis part positioning system of the present invention.

As shown in FIG. 2, the present invention relates to a multi-axis part positioning system 30, which is capable of repeatable and reproducible component fixturing for components being operated upon by Coordinate Measuring Machines (CMMs) or Numerically Controlled (NC) devices.

The positioning system 30 includes a base 32, a platen 34 slidable along the base 32, as well as first through fourth stanchions 36a–36d, respectively, which are continuously slidable along the X and Y-axis over the platen 34. The Z-axis moves vertically. The movement of each of the first through fourth stanchions 36a–36d along the X, Y, and Z-axis is controlled by a CPU 38.

The base 32 includes a platform 40, upon which the platen 34 is seated. Preferably, the platform 40 is a structure comprising a honeycomb resin material sandwiched between to plates of ⅛ inch steel. This lightweight design prevents warping but is much more manageable than the large slabs of steel commonly used. The platen 34 is locked into position using locating pins or posts and clamps.

Figure 3:
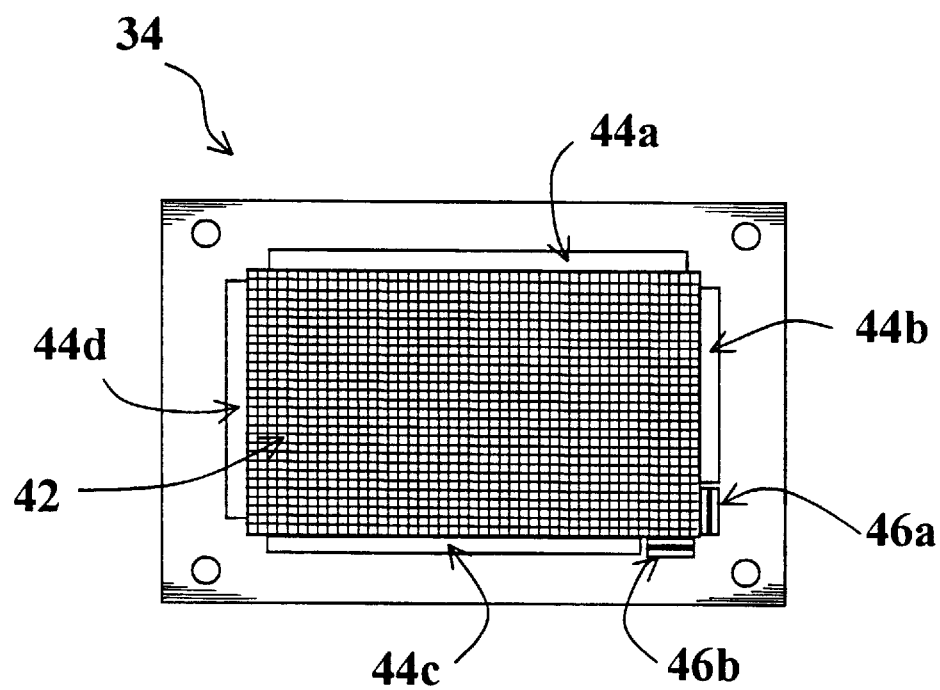
FIG. 3 is a top view of a platen (or base) of the multi-axis part positioning system.

The platen 34, as shown in FIG. 3, has a steel etched grid 42 plate having small grooves cut at 90° angles and spaced every 0.04 inch. The grids 42 act like a stator while similar grids (not shown) on the stanchions 36a–36d act like a rotor. The two together act as a dual-axis linear stepper motor allowing the stanchions 36a–36d to move along the platen in such small increments that horizontal movement along the platen 34 in the X-axis and the Y-axis is virtually continuous.

The platen 34 has rubber stops 44a–44d along its edges. The platen 34 also has Y and X-axis infrared photo-limit switches 46a and 46b, respectively, such as the PS-55 Keyence limit switch, along at least two of its edges. The limit switches 46a and 46b are preferably placed on perpendicular edges to each other, intersecting at the origin of the platen 34. The tripping of the limit switch 46b defines the initialization of one of the stanchions 36a–36d along the X-axis (i.e., X=0) and the tripping of the limit switch 46a defines the initialization of one of the stanchions 36a–36d along the Y-axis (i.e., Y=0).

Figure 4A:
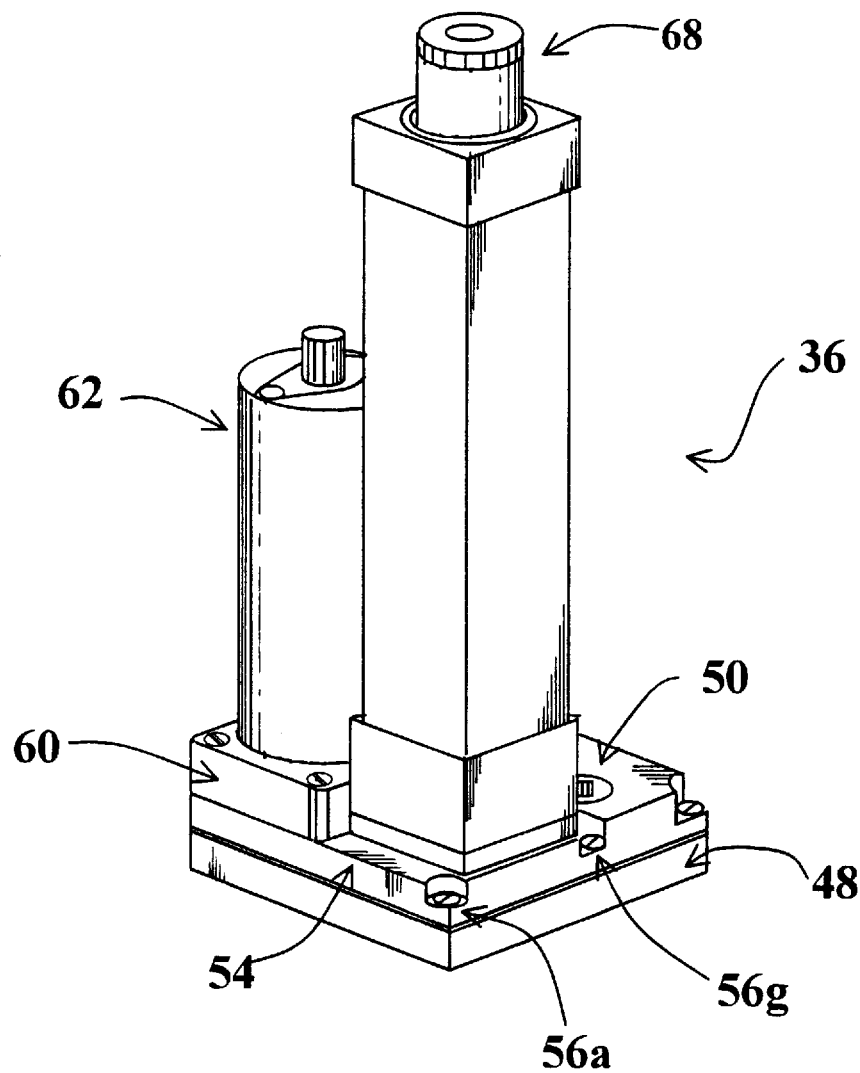
FIG. 4a is a perspective view of stanchions 36a–36d of the multi-axis part positioning system.
Figure 4B:
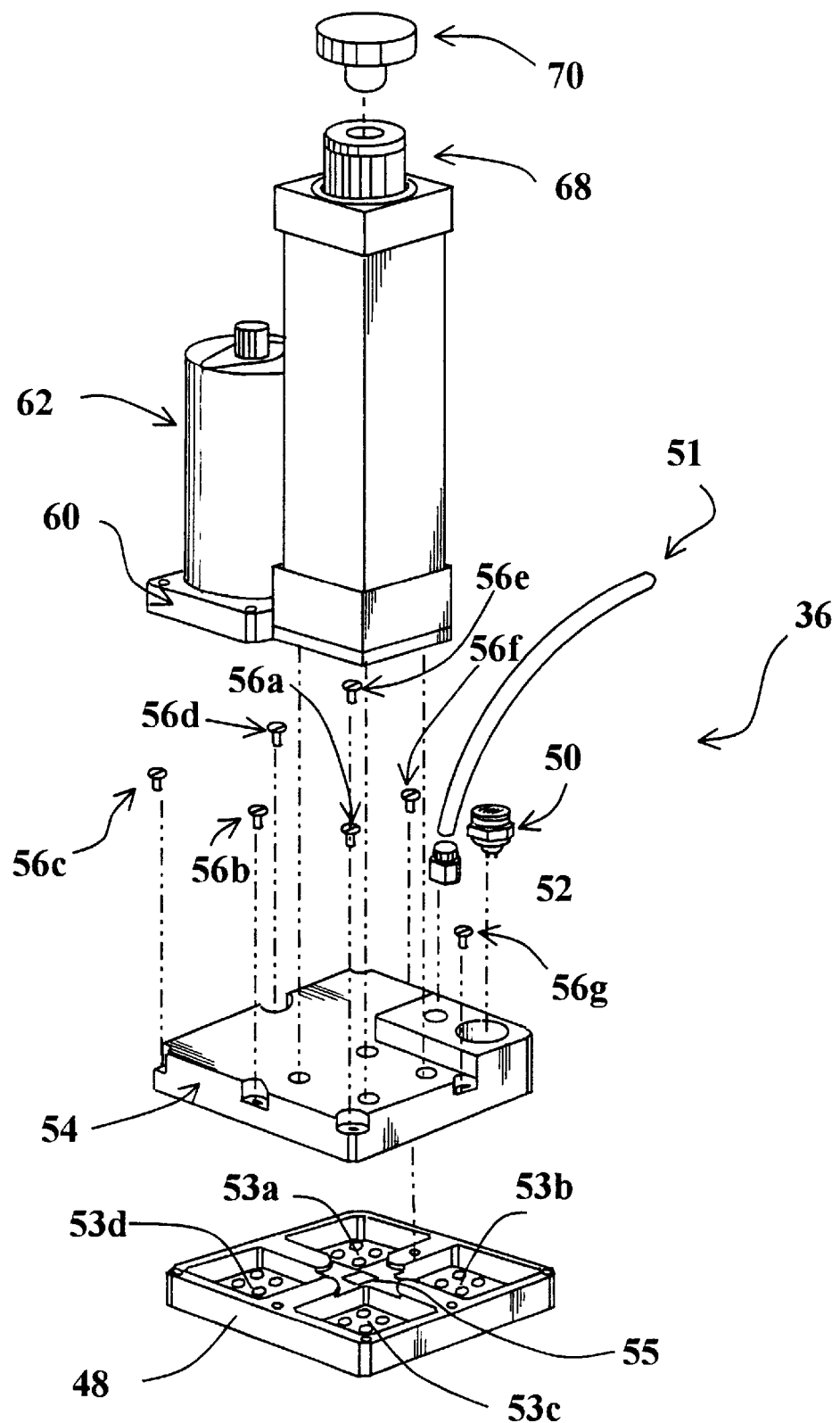
FIG. 4b is an exploded view of one of the stanchions 36a–36d of the multi-axis part positioning system.

The stanchions 36a–36d, as shown in FIGS. 4a and 4b, each include a base 48, having a grid like pattern similar to the platen 34, which, as discussed above, acts as a rotor in a dual axis motor. The change in the field along the grids causes the base 48 to slide from grid to grid on the platen 34. The CPU 38 determines how many grids the stanchions 36a–36d must travel and is indirectly coupled to the stanchions 36a–36d via an electrical connector 50.

Pressurized air is fed into each of the stanchions 36a–36d through a pneumatic connector 52, shown in FIG. 4b, and via hoses (51). The air is forced out of the bottom of the base 48 through jets 53a–53d to reduce friction between the platen 34 and the bottom of the base 48. A rare earth permanent magnet 55 is embedded in the base 48, and is used to securely hold its respective one of the stanchions 36a–36d to the platen 34 against the air bearing, and when the flow of air is discontinued it firmly holds the stanchion to the platen 34. A top plate 54 is fastened to the base 48 with fasteners 56a–56g, and an upper housing 60 is attached to the top plate 54.

As shown in FIG. 4b, the upper housing 60 holds stepper motor 62. The motor 62 is electrically connected to the CPU 38 via stepper motor drivers 64a–64d and a power switching terminal 66, as shown in FIG. 2. The stepper motor 62 is coupled to a jack screw 68, which is also mounted within the upper housing 60. The height of the jack screw 68 is controlled by the number of rotations of the stepper motor 62, which is in turn determined by the CPU 38. The stepper motor 62 is in electrical communication via an electrical cord (not shown) coupled to the connector 50.

A ram 70, as shown in FIG. 4b, fastens into the top or distal end of the jack screw 68, and is designed to hold a plurality of end effectors (not shown). The end effectors are designed to support a component in a secure, and repeatable manner. The end effector also allows for varying part holding requirements. For example, the end effector might be designed to provide suction to a flat surface or pin a component through a designated hole like a coordination hole. Another end effector may center the component in a V-groove, using a clamp and stop assembly at a key position on the component. Thus, the end effectors guarantee that a component will be consistently loaded on each of the stanchions 36a–36d for repeatable and accurate results.

The end effectors are fabricated to quickly disconnect from the end of the stanchions 36a–36d, they are also designed to be extremely flexible in grabbing and clamping components such that a minimum area of the component is blocked from being machined or inspected.

The end effectors may be either manually placed on the ram 70, or automatically picked up and loaded at a tooling changing station (not shown). The operator selects an end effector based on the component being measured, and once the component is clamped to all stanchions 36a–36d, the fixture is complete.

As shown in FIG. 2, the first through fourth stanchions 36a–36d are directed to their positions on the platen 34 and the heights of each of the stanchions 36a–36d are controlled by the CPU 38, which is preferably a Personal Computer, such as the Gateway 2000. A cable 72 connects the CPU 38 to each of the stanchions 36a–36d. Individual component programs are stored in a memory of the CPU 38. The component program in the CPU 38 is accessed either by a keyboard (not shown) or preferably by using a bar code reader to swipe a bar code on a list of bar codes (also not shown) each bar code accesses a particular program for a specific component.

The component program is originally taught to the CPU 38 by directing the movement of the stanchions 36a–36d to their preferred positions using a keyboard or a joystick. Once the X, Y, and Z positions of each of the first through fourth stanchions 36a–36d has been determined for a specific part, their exact positions are recorded in a component program that is specific for the particular component. The particular component program is assigned a part number and a bar code is made which when swiped will access the program. The operator then scans in the part number for the part he desires to fixture and the CPU 38 directs the stanchions 36a–36d to those precise positions designated in the program.

The operator also has the capability to send system initialization or teach commands to the CPU 38 using the bar code scanner. For example, an operator may swipe a bar code to re-initialize the positions of the stanchions 36a–36d by driving them to the X-limit switch 46b and the Y limit switch 46a.

Figure 5:
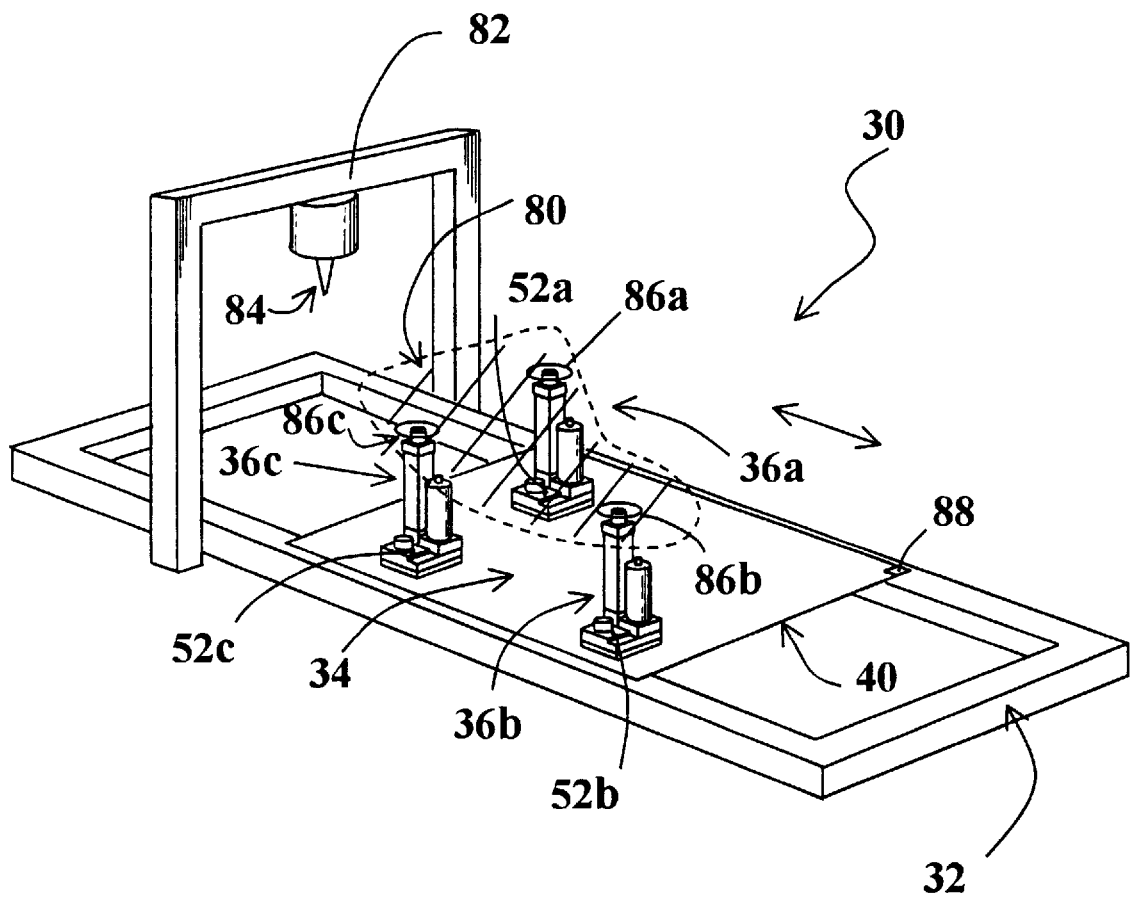
FIG. 5 is a perspective view of a first embodiment of the present invention using the multi-axis part positioning system to assist a coordinate measuring machine.

In a first embodiment, the multi-axis part positioning system 30 is used as a universal fixture for consistently holding a component 80, out of a variety of components, at a precise location for measurement by a CMM 82. As shown in FIG. 5, the CMM 82, such as a DEA/Scirocco, is equipped with a touch probe 84, such as a Renishaw touch probe. The CMM 82 is positioned inside the CMM 82 measurement envelope to allow the component 80 to be positioned on the first through third stanchions 36a–36c. The fourth stanchion 36d is not used in this embodiment but may be used for other purposes to be described later.

Initially, the stanchions 36a–36c must be taught where each should be located on the platen 34 and at what height they should extend, so that when the component 80 is held in place by end effectors 86a–86c for each respective stanchions 36a–36c, it is optimally positioned for a secure grip that does not distort the component 80. The position is also chosen to provide an accurate, consistent and reliable measurement by the CMM 82. For best measuring results the component's final position is near the central portion of the CMM 82.

To teach the stanchions 36a–36c their proper position, each stanchions 36a–36c is sequentially driven to its desired holding position and height using a computer mouse or joy stick (not shown). Once all stanchions 36a–36c have been moved and air is shut off to the air bearings, the component 80 is located to the end effectors 86a–86c at the distal end of each pre-positioned stanchions 36a–36c at a point on the component 80 that can be easily duplicated for the same type of component. For example, if the component 80 has a K-hole, a pin would be used at the distal end of the stanchions 36a–36c to help locate the component within the work area at a a position known by a CMM 82 part program. Once all stanchions 36a–36c are positioned and readjusted in the manner described above, their final position is stored in the CPU 38 under a part number, and associated with a bar code which is printed out. That bar code when scanned, will access the values of those positions that are filed under the part number. This process is repeated for each component to be measured.

The process for using the multi-axis part positioning system 30, once it has been programmed, is to teach each of the stanchions 36a–36c its position relative to the origin 88 of the platen 34. This step is necessary each time the system 30 is powered up or inadvertently loses power or one of the stanchions loses its position. The stanchions 36a–36c are each taught their positions by sequentially initializing them to point (X-0, Y-0, Z-0). To do this the operator preferably inputs a command into the CPU 38 by swiping an "initializing bar code" which invokes a program that drives each of the stanchions 36a–36c into the beam of the limit switch 46a, and then into the beam of the limit switch 46b. The limit switches 46a and 46b emit infra-red beams that run from one end of the platen 34 to the other, as shown in FIG. 3. This allows each of the stanchions 36a–36c to be initialized anywhere along the side of the platen 34. After each of the stanchions 36a–36c triggers each limit switch 46a and 46b, the stanchions 36a–36c are completely stopped and then slowly driven off the tripped limit switch. The position of the stanchions 36a–36c is then zeroed in a register of the CPU 38 when the tripped limit switch returns to an untriggered state. Preferably, the stanchions 36a–36c are zeroed one at a time to prevent them from running into each other. After this step, the anti-collisoin software is operative. The initial position of the distal end of each of the stanchions 36a–36c is determined using a reed relay limit switch, as is known in the art.

Once initialized, the stanchions 36a–36c automatically move to a home position and await further instructions from the CPU 38. To measure the component 80, the operator uses the bar code reader to scan the part number of the component 80 into the CPU 38.

Initially, the platen 34, as shown in FIG. 5, slides along the base 32 towards the operator. Next, the appropriate end effectors 86a–86c are either manually or automatically placed on the ram 70 of each of the stanchions 36a–36c. The CPU 38 then accesses a part file in which is stored the position where each of the stanchions 36a–36c should be on the platen 34, and determines how many steps produced by each of the stepper motor drivers 64a–64c, shown in FIG. 2, will move the respective stanchions 36a–36c from their current position to the position required in the computer file associated with component 80. The CPU 38 then activates an air supply (not shown) which forces air to connectors 52a–52c reducing the friction between the stanchions 36a–36c and the platen 34. Once air is being supplied, the CPU 38 activates the dual axis linear stepper motors in each of the stanchions 36a–36c via the power switch terminal 66 and drivers 64a–64c, shown in FIG. 2, until each of the stanchions 36a–36c has reached the designated position along the X and Y-axis. Next, the CPU 38 activates the vertical stepper motors 62a–62c of each of the respective stanchions 36a–36c based on their present position and the number of steps required for each to reach their desired position. An anti-collision program ensures that the stanchions 36a–36c never collide as they move toward their intended positions. Once the stanchions 36a–36c have reached their intended position, the air source through connector 52a–52c is discontinued and the stanchions 36a–36c are locked into place by the rare earth magnet embedded into their respective base 48.

Next, the component 80 is fastened to the end effectors 86a–86c, which were attached to each of the stanchions 36a–36c. The end effectors 86a–86c are attached in a manner such that the component 80 is measured consistently at the same relative points each time.

Once the component 80 has been securely fastened, the platform 40 is slid pneumatically along base 32 until it is directly under the CMM 82. The platform 40 is then locked into position.

Since the component 80 is always placed in the same position relative to the CMM 82, the CMM 82 only needs to calculate the offset between the predefined datum plane of the component 80 and the machine axis of the CMM 82 to begin proper measurements. However, to ensure accuracy, it is preferred to have the CMM 82 perform one iteration on the datum plane to verify that the component 80 is actually in the position where the CMM 82 is programmed to anticipate it, and if not, to calculate the appropriate corrections. The CMM 82 then performs the measurement and the base 40 is pneumatically slid back to the operator for easy removal. Once the component 80 is removed, the stanchions 36a–36c are not required to be reset, reinitialized, or put in their home position but will simply move to the next instructed position as directed by the CPU 38.

The system 30 provides measurements that are so consistent, statistical process control can be used to measure any trends in similar components which would indicate the deterioration of machining tools, etc.

Another advantage to the system 30 is that the setup can be accessed by the CMM program, which can readjust measurements by knowing where datum planes will be in relation to the CMM machine axis. Further, setup time is dramatically reduced over current fixture methods, and the setups are repeatable and reproducible with little or no variation. Also, no manual initial alignment is needed which significantly increases the rate at which components can be measured accurately.

Figure 6:
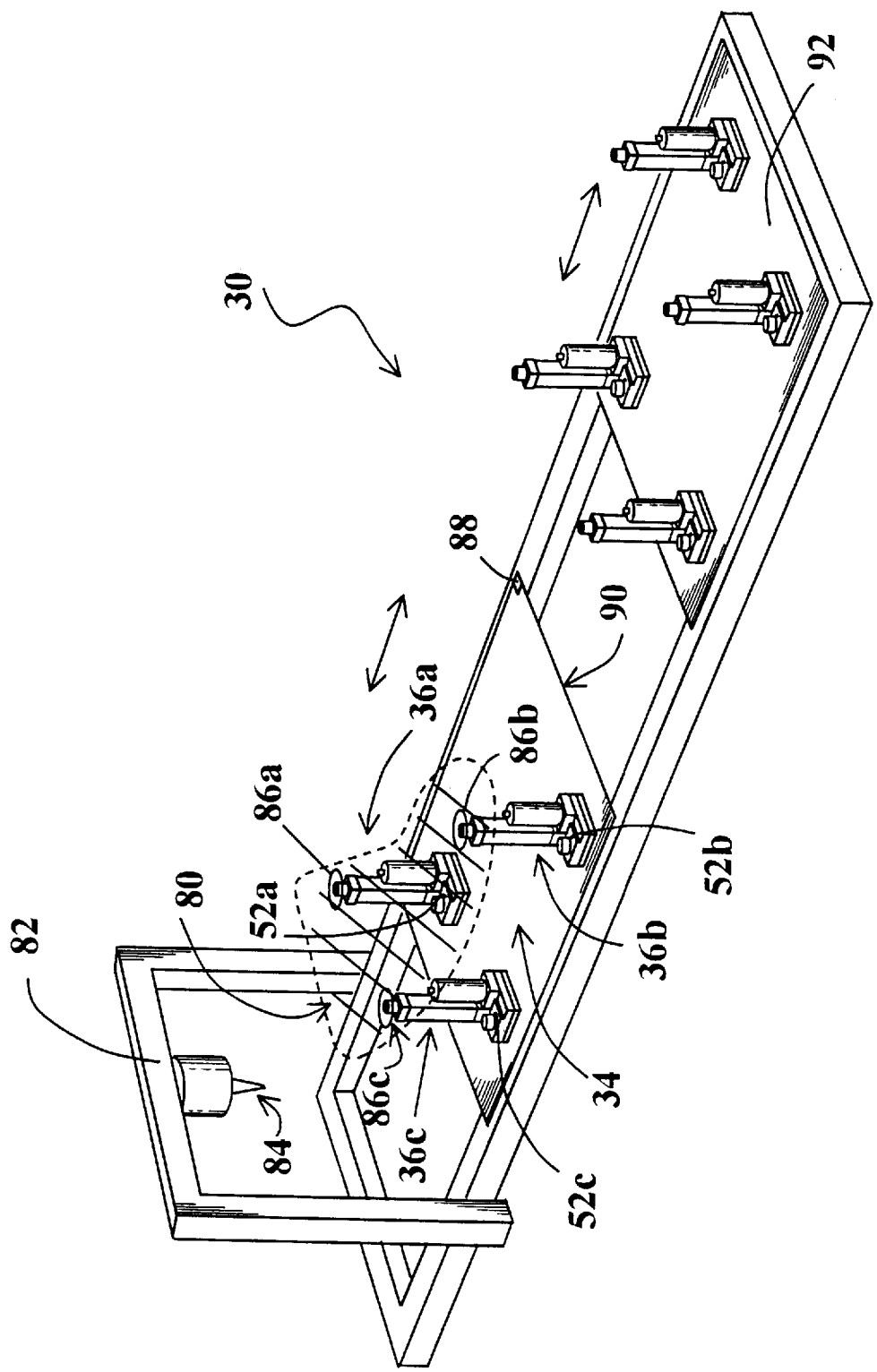
FIG. 6 is a perspective view of a second embodiment of the present invention using two sets of fixtures.

In a second embodiment, as shown in FIG. 6, two platforms 90 and 92 carrying two separate systems 30 which are placed on a common base 32 at either end. The platform 90 is utilized to fixture a component 80 currently being measured, while the other platform 92 is setup for the next component to be measured. Thus, the present system 30 has a setup speed that can be significantly enhanced because the CMM 82 can be measuring a component 80 on one platen 90 while the other platen 92 is being loaded with the next component 80.

Figure 7:
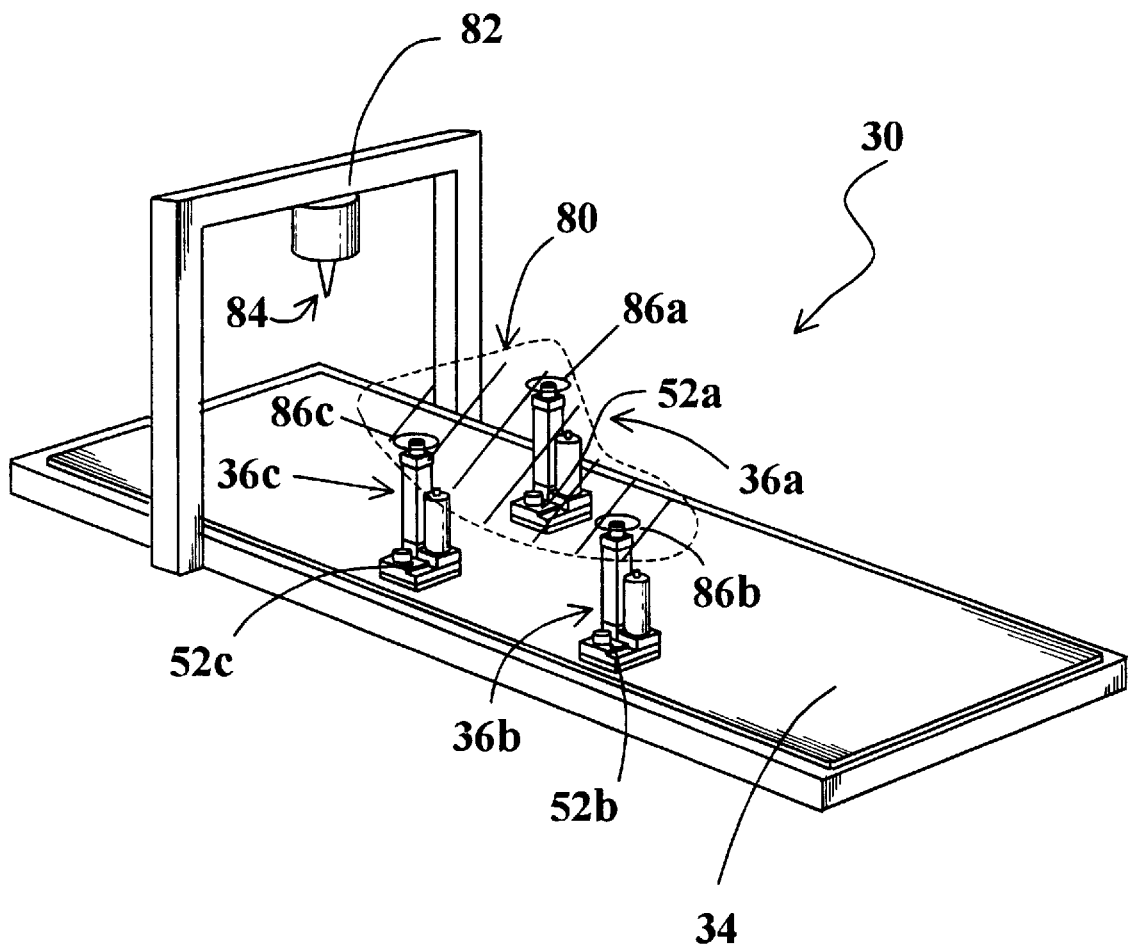
FIG. 7 is a perspective view of a third embodiment of the present invention using a large platen instead of a slidable platform.

In a third embodiment, as shown in FIG. 7, the pneumatically driven slide assembly that moves the platform 40 along the base 32 is replaced by one large platen 34 that extends the entire length of the base 32. The stanchions 36a–36c move in unison to the operator, and arrange themselves to fixture the component 80. Once the component 80 has been setup, the stanchions 36a–36c move in unison to a predetermined position below the CMM 82 while carrying the component 80, eliminating the need to shuttle smaller platens in and out of the work space.

Figure 8:
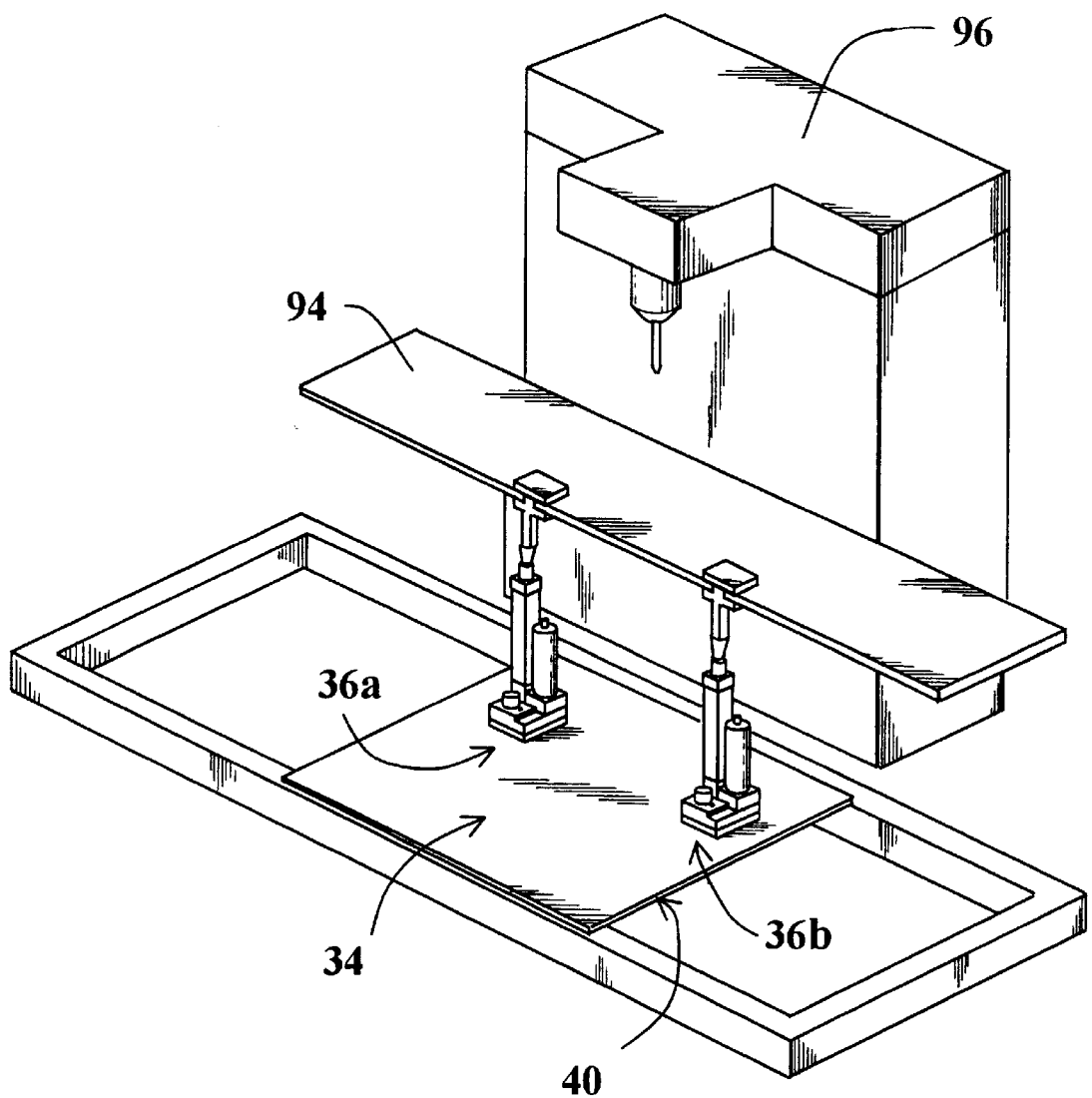
FIG. 8 is a perspective view of a fourth embodiment of the present invention using the multi-axis port positioning system to assist an NC device.

In a fourth embodiment, as shown in FIG. 8, the stanchions 36a and 36b are used to position a piece of stock material 94, adjacent to an NC device 96 to allow the NC device 96 to perform various operations on the piece of stock 94, such as a drilling operation. The stanchions 36a and 36b could remain stationary relative to the NC device 96, or they may move in unison with the part loaded and rearrange the position of the piece of stock 94 relative to the NC device 96.

As mentioned above, the stanchions 36a–36d need not be used in the task of fixturing, but may be removed or utilized to perform other tasks. An extra stanchions can be used in conjunction with a laser cross-hair to locate a point on the fixture. The additional stanchions 36a–36d could be used to locate holes or other features in the component. In the alternative, the extra stanchions 36a–36d could be used to enhance NC machine operations. For example, a bucking bar could be attached to an additional stanchions to provide support during riveting operations, or to support a part while it is being machined. Another use of the extra stanchions is to attach it to a drill busing. The busing is then be made to follow the NC device or a manually operated tool to provide accuracy and support.

Finally, in a preferred embodiment additional encoders can be used with the stanchions 36a–36d to create a closed loop system. The system 30 could be programmed to compensate for expansion or contraction of the fixture due to temperature changes or to compensate for variations in height if operated on an uneven, nonlevel surface, such as an inclining table.

These and additional embodiments provide many unique advantages not currently found in the art. For example, since an operator is no longer required to lift heavy knee blocks in place the risk of operator injury is greatly reduced. Further, mirror image (i.e., opposite hand) setups can be made automatically using the original setup located in the memory of the CPU 38. Also, configurations can be rapidly changed. The present invention leaves no adhesive residual on components, and it holds delicate or flexible parts in proper contour for accurate measurement. The system also requires less maintenance than many fixtures currently in use. Another advantage to the system is it is effectively indexable to outboard robotics and CMM axis systems. One of the most unique features of the present system is the ability of the stanchions 36a–36d to move continuously and freely anywhere on the platen, including the ability to cross over each other to reach their optimum positions. The present system has many applications in lean manufacturing where machine centers are rapidly changed over to machine new and different parts. The present system's flexible tooling will enhance the machinist's ability to fixture different parts while reducing tooling costs.

While the foregoing has been a discussion of a specific embodiment of the present invention, those skilled in the art will appreciate that numerous modifications to the disclosed embodiments may be made without departing from the spirit and scope of the invention. Accordingly, the invention is limited only to the following claims.

What is claimed is:

1. A universal fixture for holding a component relative to an established reference frame, said fixture comprising:
    a base fixable relative to said established reference frame wherein said base includes a platen positioned on a plane defined by a surface of said base wherein said platen includes a steel etched grid having small grooves cut at 90° angles;
    a plurality of stanchions continuously movable along an x-axis and y-axis of the plane defined by the surface of said base; and a CPU in electrical communication with said platen and each of said plurality of stanchions for directing each of said stanchions to a position on said platen.

2. The universal fixture of claim 1, further comprising end effectors coupled to each of said plurality of stanchions to hold the component relative to the established reference frame.

3. The universal fixture of claim 1, wherein said position is taught to said CPU for each type of a component and stored in its own particular memory location in said CPU.

4. The universal fixture of claim 3, wherein said CPU retrieves the particular memory location for a particular component by inputting bar code data containing information about a part number assigned to the type of the component.

5. The universal fixture of claim 3, wherein said bottom of each of said stanchions includes a rare earth magnet to securely lock each of said stanchions in place once reaching the directed position.

6. The universal fixture of claim 1, wherein said platen forms the entire surface of said base.

7. A universal fixture for holding a component relative to an established reference frame, said fixture comprising:

a base fixable relative to said established reference frame wherein said base includes a platen positioned on a plane defined by a surface of said base;

a plurality of stanchions continuously movable along an x-axis and y-axis of the plane defined by the surface of said base wherein said stanchions each have a bottom with a plurality of air jets that eject air between the bottom and the platen to reduce friction while the stanchions are moving to the directed position and wherein said base of each of said stanchions includes a steel etched grid; and a CPU in electrical communication with said platen and each of said plurality of stanchions for directing each of said stanchions to a position on said platen.

8. A universal fixture for holding a component relative to an established reference frame, said fixture comprising:

a base fixable relative to said established reference frame wherein said base includes a platen positioned on a plane defined by a surface of said base; and a plurality of stanchions continuously movable along an x-axis and y-axis of the plane defined by the surface of said base, a CPU in electrical communication with said platen and each of said plurality of stanchions for directing each of said stanchions to a position on said platen, wherein said stanchions and said platen act together as a dual axis motor to drive each of said stanchions to the position directed by the CPU.

9. The universal fixture of claim 8, wherein said stanchions position said component for measurement by a coordinate measurement machine.

10. The universal fixture of claim 9, wherein said stanchions are positioned independent of any action taken by said coordinate measurment machine.

11. A universal fixture for holding a component relative to an established reference frame, said fixture comprising:

a base fixable relative to said established reference frame wherein said base includes a platen positioned on a plane defined by a surface of said base wherein said base also includes a slidable platform upon which the platen is mounted;

a plurality of stanchions continuously movable along an x-axis and y-axis of the plane defined by the surface of said base; and a CPU in electrical communication with said platen and each of said plurality of stanchions for directing each of said stanchions to a position on said platen.

12. The universal fixture of claim 11, wherein said stanchions position said component for an operation conducted by a Numerically Controlled device.

13. A universal fixture for holding a component relative to an established reference frame, said fixture comprising:

a base fixable relative to said established reference frame wherein said base includes a platen positioned on a plane defined by a surface of said base; and a plurality of stanchions continuously movable along an x-axis and y-axis of the plane defined by the surface of said base wherein each of said stanchions includes a stepper motor coupled to a jack screw; and a CPU in electrical communication with said platen and each of said plurality of stanchions for directing each of said stanchions to a position on said platen, wherein the stepper motor is electrically coupled to the CPU.

14. The universal fixture of claim 13, wherein the height of the component above said base is controlled the number of rotations of said stepper motor in response to a signal from said CPU.

* * * * *